(12) United States Patent
Wiedl et al.

(10) Patent No.: US 7,191,547 B2
(45) Date of Patent: Mar. 20, 2007

(54) INSTALLATION FOR DRYING OR DEHYDRATING GOODS

(75) Inventors: Alfred Wiedl, Landskron (AT); Alfred Freh, Rax-Bergen 98, Jennersdorf (AT) A-8380; Alois Reiterbauer, Schildbach 30, Hartberg (AT) A-8230

(73) Assignees: Alfred Freh, Jennersdorf (AT); Alois Reiterbauer, Hartberg (AT)

( * ) Notice: Subject to any disclaimer, the term of this patent is extended or adjusted under 35 U.S.C. 154(b) by 109 days.

(21) Appl. No.: 10/534,682

(22) PCT Filed: Nov. 12, 2003

(86) PCT No.: PCT/AT03/00341

§ 371 (c)(1),
(2), (4) Date: May 12, 2005

(87) PCT Pub. No.: WO2004/043574

PCT Pub. Date: May 27, 2004

(65) Prior Publication Data

US 2005/0268481 A1    Dec. 8, 2005

(30) Foreign Application Priority Data

Nov. 12, 2002  (AT) .............................. A 1702/2002

(51) Int. Cl.
*F26B 3/34*   (2006.01)

(52) U.S. Cl. ............................................. 34/264; 34/80
(58) Field of Classification Search .................. 34/473, 34/78, 79, 80; 95/99, 106; 96/126, 130

See application file for complete search history.

(56) References Cited

U.S. PATENT DOCUMENTS

| 4,038,054 A | 7/1977 | Gräff |
| 4,421,651 A | 12/1983 | Burkholder et al. |
| 4,601,114 A | 7/1986 | Noguchi |

(Continued)

FOREIGN PATENT DOCUMENTS

| CH | 436 612 | 11/1967 |

(Continued)

*Primary Examiner*—S. Gravini
(74) *Attorney, Agent, or Firm*—Laurence A Greenberg; Werner H. Stemer; Ralph E. Locher

(57) ABSTRACT

The present invention relates to a novel installation (100) for drying products (70) of the most varied type, the dehumidifying apparatus (10) of which comprises two silica-gel adsorbent bodies (20, 20') which work in alternating operation and which—in a periodically mutually alternating manner—pass through an adsorption or dehumidifying phase (EB) and a regeneration phase (RB), the periodic changeover to the respective other phase and vice versa being effected by means of a control unit (8), which can be supplied with moisture data or the like from moisture sensors or the like, e.g. as a function of the moisture of the air after passing through the adsorbent body (20, 20') which is in the regeneration phase (RB), the dehumidified air (lt) being drawn by means of a suction fan (71) through a drying chamber (7) containing the product (70) to be dried.

The novel installation is characterized in that its dehumidifying apparatus (10)—for the provision of regeneration air (lr)—has at least one air-conduction line (47, 57) for the air (lf) which is expelled from the drying chamber (7) and contains the moisture received from the product (70) to be dried and which, as regeneration air (lr) provided for the regeneration of the adsorbent body (20, 20') laden or saturated with water in the regeneration operation (RB), can in each case be introduced in a periodically alternating manner into one of the adsorbent bodies (20, 20') and can be moved or conveyed through the same.

17 Claims, 4 Drawing Sheets

U.S. PATENT DOCUMENTS

| | | | |
|---|---|---|---|
| 4,805,317 A * | 2/1989 | Inglis et al. | 34/259 |
| 5,123,277 A * | 6/1992 | Gray et al. | 73/29.01 |
| 5,199,964 A | 4/1993 | Gräff | |
| 5,429,665 A | 7/1995 | Botich | |
| 5,485,686 A * | 1/1996 | Sears, Jr. | 34/473 |
| 6,226,888 B1 | 5/2001 | Lang | |
| 6,920,763 B2 * | 7/2005 | Amundsen et al. | 62/55.5 |

FOREIGN PATENT DOCUMENTS

| | | |
|---|---|---|
| DE | 298 20 870 U1 | 3/1999 |
| DE | 201 06 617 U1 | 7/2001 |
| EP | 0 379 975 A2 | 8/1990 |
| EP | 1 010 452 A1 | 6/2000 |

* cited by examiner

INSTALLATION FOR DRYING OR DEHYDRATING GOODS

BACKGROUND OF THE INVENTION:

Field of the Invention

The present invention relates to a novel installation for drying or dehumidifying products of the most varied type or, if need be, also of larger structures, such as, for example, buildings or the like. The products to be dried are advantageously compact, lumpy or pourable and the range of the same extends from foodstuffs and construction materials to pharmaceutical products.

In the case of various products, in particular in the case of those of the foodstuff, dietary and medicine sector, it is necessary by means of drying operations to ensure that these products have a certain degree of moisture corresponding, for example, to the statutory regulations applicable in each case, or do not exceed this degree of moisture, in order to ensure, for example, their durability.

A suitable method of dehumidifying products of the most varied type is to actually heat them to relatively high temperatures, but this drying method, which has been known for a long time, is restricted to products which are not temperature-sensitive. For products which are sensitive to heating, apart from the application of vacuum, virtually the only suitable method is to allow possibly slightly heated air having a low moisture content to flow over or through them, the flow of this dry air absorbing moisture from the product and discharging it, for example, to the outside.

Furthermore, in order to achieve air having a low degree of moisture, it is known to cause it to flow through a hydrophilic adsorbent in order to extract from it there the moisture contained in it until a desired low degree of moisture is achieved. In order to regenerate the adsorbent, which in the process is finally laden with moisture in the form of water, desorption of the absorbed water is to be carried out by heating the adsorbent and expelling the adsorbed water from the same, usually assisted by passing through a carrier gas flow, in particular an airflow.

Since energy, in particular in the form of electric current, will be in increasingly short supply in the coming years, inter alia due to the criticism of nuclear power generation, and as a consequence of the continually increasing demand from industry, it is attempted in every technical process to keep the consumption of energy, that is to say of electric power in particular, as low as possible. Conventional drying installations using dehumidifying adsorbents are very efficient, but have a high energy demand, in particular electric power demand, since in these installations the adsorbent to be dried, in whatever form, e.g. as granulation or as porous body, is normally dried by means of electric heating elements. In order to remove from the adsorbent the water absorbed by it, relatively high temperatures and thus a high expenditure of energy are thus required, the water absorbed by the adsorbent being vaporized and being discharged as essentially saturated water vapor usually into the ambient atmosphere.

A method that has become increasingly popular in recent years for the heating of hydrous or moisture-containing products consists in heating the respective product with microwaves instead of with conventional heating bars. Here, in particular in the case of inorganic moisture-containing products, there is the advantage that an inorganic product itself is essentially not heated by means of microwave energy, but rather only the water molecules of the moisture absorbed by it and contained in it are activated and can be expelled from the product as heated water vapor.

Thus, U.S. Pat. No. 4,421,651 A discloses a method and an apparatus in which, in order to regenerate a molecular sieve adsorbent loaded with organic vapors, provision is made to heat said molecular sieve adsorbent by means of microwave generators, in particular magnetrons.

As far as the prior art is concerned, reference is made to the follow publications.

EP 1 010 452 A1, CH 436 612 A, U.S. Pat. No. 5,429,665 A, EP 379 975 A2 and U.S. Pat. No. 4,038,054 A.

All of these publications disclose apparatuses for the drying of air which have two adsorbent bodies which work in alternating operation and pass periodically through an adsorption and a regeneration phase in a mutually alternating manner.

For example, EP 1 010 452 A1 discloses silica gel as adsorbent and microwave energy sources for its regeneration, and also a changeover, effected by means of a sensor-assisted control unit, from adsorption operation to regeneration operation in each case by switching off the regeneration heat sources and changing over an appropriately positioned three-way valve.

EP 379 975 A2 describes an air-drying installation, whose changeover from the adsorption operation to the regeneration operation is effected by means of a control unit, which can be supplied with temperature data from temperature sensors, to be precise as a function of the temperature of the air after passing through the adsorbent in the regeneration state. Furthermore, it is known from this EP-A2 to draw the dehumidified air through a drying container by means of fans.

U.S. Pat. No. 4,038,054 A also discloses a drying apparatus in which a rotary slide valve is rotated clockwise or counterclockwise from a certain position by a certain angle and as a result changes over in each case one of the two adsorbents to adsorption operation or regeneration operation. The fan there may be arranged downstream or upstream of the drying container.

SUMMARY OF THE INVENTION

The present invention relates to a novel installation, distinguished by a simple construction and an especially low energy demand, for drying a moisture-containing product from the group comprising individual parts and pourable material, biological material, fuels, foodstuffs, pharmaceuticals and the like according to the details of the preliminary or classifying part or preamble of claim 1.

The novel drying installation is characterized according to the characterizing part of this claim 1 in that its dehumidifying apparatus—for the provision of regeneration air—has at least one air-conduction line for the air which is expelled from the drying chamber and contains the moisture received from the product to be dried and which, as regeneration air provided for the regeneration of the adsorbent body laden or saturated with water, can in each case be directed periodically to the regeneration-air feeds or charging chambers or to one of their regeneration-air charging fans and can be introduced into one of the adsorbent bodies in one of the air-dehumidifying chambers and can be moved through the same.

Especially preferred, and favorable with regard to the reduction of the energy demand, is an embodiment of the novel installation having periodic changeover from air dehumidifying to adsorbent regeneration, and vice versa, with a construction according to claim 2.

In the course of investigations which have led to the invention it was found that it is especially favorable in terms of energy and with regard to the drying efficiency to draw the air to be dehumidified through the adsorbent body during the dehumidifying operation, as can be seen in more detail from claim 3.

Alternatively, and with regard to an effective and at the same time protective dehumidification of a product to be dried, additional energy savings can be made if the air coming from the adsorbent body of the dehumidifying apparatus is not directed under pressure over or through the product to be dried, but rather, with vacuum remaining, this air dehumidified by means of the respective adsorbent body is directed, that is to say drawn, over or through the product to be dried after leaving the dehumidifying apparatus, as can likewise be seen as an alternative from claim 3.

For the regeneration of the adsorbent body laden with the water extracted from the air, an embodiment of the installation may be advantageous in which provision is made for the air provided for the regeneration of the adsorbent body to flow under pressure through the latter, which is to be regenerated periodically, as disclosed in claim 4.

A simple, robust and effectively controllable drying installation which is especially preferred within the scope of the invention can be seen from claim 5, in which drying installation both the air-dehumidifying operation and the adsorbent-body regeneration operation are successively effected in each case in an alternating manner, to be precise with the drying chamber in between, always only under vacuum.

Claim 6 relates to an addition to the novel installation which ensures the vacuum or suction operation of the novel installation with a high degree of operating reliability and effectiveness.

The subject matter of claim 7 is an especially preferred embodiment of the installation according to the invention, which is distinguished in particular by the fact that only a single suction fan is required, by means of which, on the suction side, in each case in an alternating manner, the air provided for the dehumidifying of the product in the drying chamber is drawn under vacuum through the first installation lane which is in air-dehumidifying operation and then through the drying space containing the product to be dehumidified, and, on the fan pressure side, the moisture-laden air drawn off beforehand is moved or conveyed as regeneration air under vacuum through the installation lane which is in regeneration operation.

Serving for even better utilization of energy is a configuration of the novel installation according to claim 8, in which the fresh or ambient air entering or drawn into the dehumidifying apparatus is preheated by means of the regeneration air which leaves the installation lane in regeneration operation, is laden with the moisture from the product to be dehumidified and with the water desorbed from the adsorbent body laden or saturated with water, and is heated by means of the megatron which is in operation there.

Claim 9 discloses a special embodiment of the novel installation having bypass lines, which can be mutually regulated by short circuit and choke, for admixing a fresh- or ambient-air proportion of, for example, 25% to the dehumidified air coming or drawn in from the first installation lane, which in each case is in dehumidifying operation just at that moment, and directed into the drying chamber.

For the changeover, to be carried out inside the installation, from dehumidifying operation to regeneration operation, or of the three-way changeover provided for this purpose, control of the latter by means of corresponding moisture measuring sensors, connected for the flow of data to a control unit, according to claim 10 is especially preferred.

For the changeover from one mode of operation to the other, that is to say, in particular, in order to switch off the microwave generator at the end of the regeneration of the adsorbent body when at least most of the water adsorbed by the latter is desorbed by it, it can be especially favorable, as control variable, in addition to or instead of a measurement of the moisture of the moisture-laden regeneration air flowing out of or drawn off from the adsorbent body, to detect the power consumption, significantly increasing when the adsorbent is essentially completely regenerated, of the microwave generator, as can be seen from claim 11.

BRIEF DESCRIPTION OF THE DRAWING

The invention is explained in more detail with reference to the drawing.

In the drawing, in each case schematically.

DESCRIPTION OF THE PREFERRED EMBODIMENTS

Figure 1:
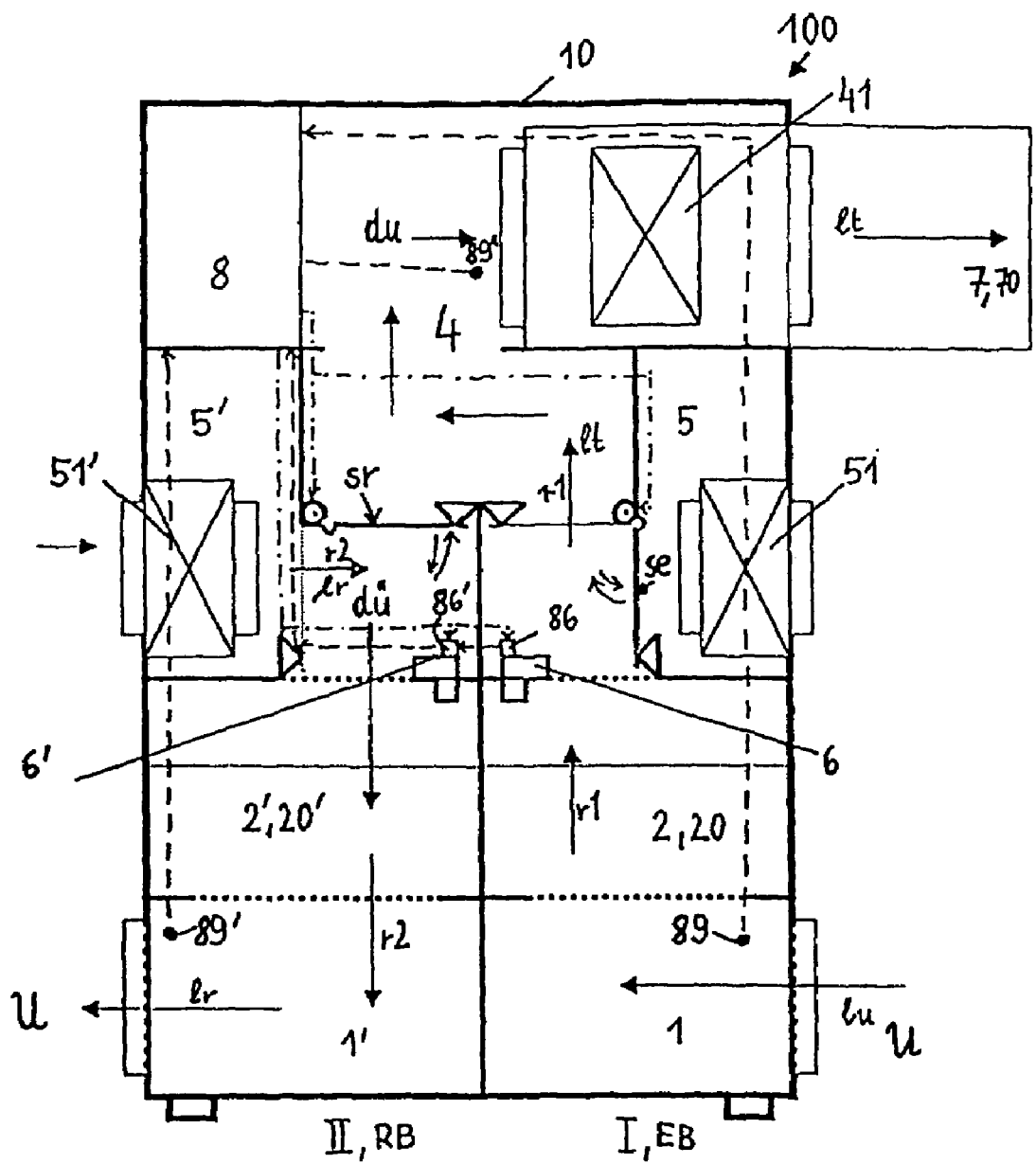
FIG. 1 shows a drying installation corresponding essentially to the prior art and FIGS. 2, 3, 4a and 4b show three respectively different advantageous embodiments of drying installations according to the invention, the one according to FIGS. 4a and 4b being especially preferred.

The air-dehumidifying apparatus 10 shown in FIG. 1 and forming the essential component of a drying installation 100 corresponding to the prior art comprises essentially at least two operating lanes I and II, shown here accommodated in a common housing, of chambers or the like preferably arranged one above the other and connected to one another, to be precise with a respective feed or inlet chamber 1, 1', arranged right at the bottom, for fresh or ambient air lu available in each case and a respective, adjoining air-dehumidifying chamber 2, 2' which is arranged here above said feed or inlet chamber 1, 1' and in which a respective air-dehumidifying adsorbent body 20, 20', preferably based on silica gel, is arranged. The bottom and the top boundary wall of the dehumidifying chambers 2, 2' in FIG. 1 are each designed to be permeable to airflow, that is to say, for example, as a perforated plate, grid or the like and thus, when microwave generator or magnetron 6, 6' is at first not switched on, allow the air which is to be dehumidified to pass from the environment through the air feed or inlet chamber 1, 1' and to and through the adsorbent body 20, 20' and allow dehumidified or dried air lt to be discharged from the latter after it has flowed through in the upward direction r1.

Arranged in each of the dehumidifying chambers 2, 2' is a magnetron 6, 6' for the microwave heating of the respective adsorbent body 20, 20' in the course of its regeneration, that is to say for the desorption of the water received by the latter from the air to be dehumidified. In the version of the installation 100 shown here, the dehumidified air lt passes under vacuum du, that is to say under suction effect, from the dehumidifying chamber 2, 2' into a dry-air discharge 4 common to both operating lanes I, II and having a suction fan 41 arranged there for the discharge of the dehumidified air lt into a drying chamber 7 (not shown in any more detail) containing a product 70 to be dried and passes from said drying chamber 7 to the outside.

Arranged above each of the dehumidifying chambers 2, 2' is a regeneration-air feed or charging chamber 5, 5' having a forced-draft fan 51, 51' for introducing the regeneration air lr, which is provided for the regeneration of each of the adsorbent bodies 20, 20' and is extracted from the environment U and which is directed or conveyed under positive pressure dü in the downward flow direction r2, opposed to the upward flow direction r1 of the ambient air lu to be dehumidified through the adsorbent body 20', 20 during the dehumidifying operation EB in the first installation lane I, through the other respective adsorbent body 20, 20' of the second installation lane II constructed like the first installation lane I and finally leaves the dehumidifying apparatus 10 outward into the circulating air U through the fresh-air feed or inlet chamber 1', 1 serving to expel moisture-laden regeneration air lff.

While the dehumidifying operation EB is running in the first installation lane I, and the path for the air lt dehumidified during the passage through the adsorbent body 20, 20' is opened in the upward suction direction r1 toward the dry-air discharge 4 by means of one of the three-way changeover or closing members 3, 3', namely the member 3, in the air-dehumidifying position se and the regeneration-air charging chamber 5, 5' is closed in the process, the second installation lane II is switched to regeneration operation RB. In this lane II, the second three-way changeover or closing member 3', 3, in the regeneration position sr, opens the path for the regeneration air lr in the second direction r2 from the regeneration-air feed or charging chamber 5', 5 to the respectively second dehumidifying chamber 2' and through its adsorbent body 20', 20, the path from the respectively second dehumidifying chamber 2' to the dry-air discharge being blocked at the same time.

In the dehumidifying chamber 2', 2, the microwave generator 6', 6 is switched on during the regeneration operation RB and expels the water, absorbed during the dehumidifying operation EB which has taken place there beforehand, from the second adsorbent body 20', 20 in the form of water vapor, which is received and entrained by the flow of the regeneration air lr flowing through the same and is delivered to the environment U through the fresh- or ambient-air inlet chamber 1', 1.

In order to explain the control of the novel installation, this control actually constituting an advantageous design detail and an advantageous integral part of the present invention, the basic task or function of said control is explained below.

The periodic changeover in each case from dehumidifying operation EB to regeneration operation RB and vice versa is controlled by means of the three-way changeover or closing members 3, 3' in each of the installation lanes I and II by means of the control unit 8, which is supplied with moisture data from the moisture measuring sensors 89, 89', 89" connected to it for the flow and exchange of measuring data and arranged in each of the fresh-air feeds or inlet chambers 1, 1' and in the dry-air discharge. If, for example, the measuring sensor 89" in the discharge signals a significant increase in the moisture in the dehumidified air lt, coming from the respective adsorbent body 20, 20', beyond a predetermined limit value during the dehumidifying operation EB, or if one of the moisture measuring sensors 89', 89 in the ambient-air inlet chamber 1', 1 signals a significant drop in the moisture content in the regeneration air lr to the central control unit 8 during the regeneration operation RB, the latter effects a changeover from dehumidifying operation EB to regeneration operation RB in one of the operating lanes I and II with essentially simultaneous changeover from the regeneration operation RB to dehumidifying operation EB in the respective other installation lane II and I by virtue of the fact that the three-way changeover or closing member, e.g. the three-way damper 3, blocks the path toward the dry-air discharge 4 in one of the lanes I, II, namely in the lane I, and at the same time opens the path toward the regeneration-air feed or charging chamber 5, while in the respective other lane II the microwave generator 6' is switched off and remains switched off and the three-way damper 3' remains blocked toward the dry-air discharge 4 and is opened toward the regeneration-air feed or charging chamber 5. At the same time, the control unit 8 ensures that the fan 51', 51 of the regeneration-air feed or charging chamber 5', 5 is correspondingly switched on in each case.

The changeover rhythm described may be about 10 min, e.g. at a quantity of 12 kg silica gel in the adsorbent body 20, 20' in each of the air-dehumidifying chambers 2, 2' and at a maximum permissible respective output of the magnetrons 6, 6', without complicated screening measures, of 1.5 kW.

In addition, or alternatively, a measuring sensor 86, 86' connected to the control unit 8 for the flow of measuring data and intended for determining the power consumption of the magnetron 6, 6' may be provided for the control of the novel dehumidifying apparatus 10, by means of which measuring sensor 86, 86', during a significant increase in the power consumption of the magnetron 6, 6', the control unit 8 is made to change over the respective mode of operation from dehumidifying operation EB to regeneration operation RB or vice versa.

Figure 2:
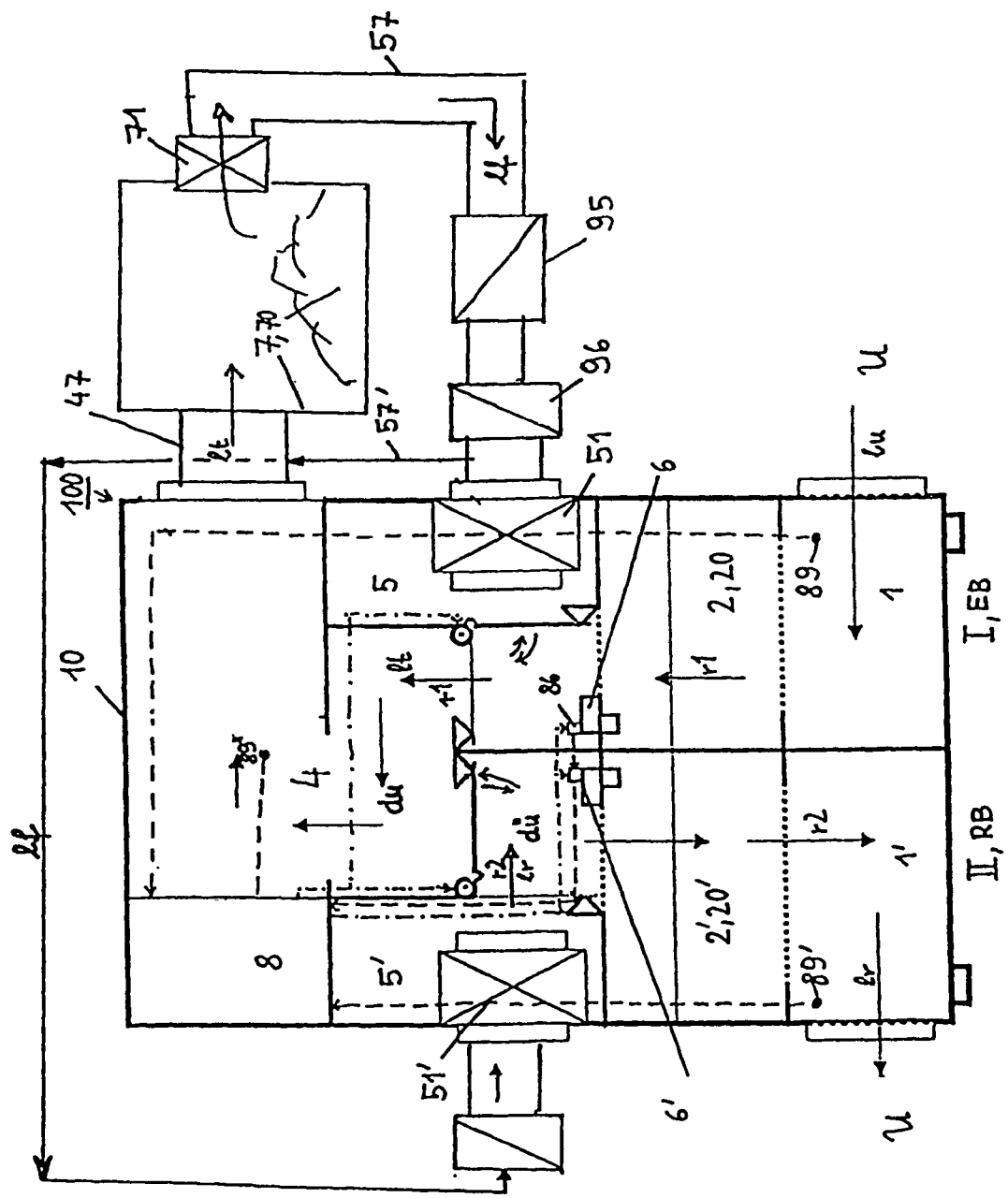

With reference numerals and functions within the dehumidifying apparatus 10 otherwise remaining the same, FIG. 2 shows an entire drying installation 100 according to the invention, in which—unlike in that in FIG. 1, where the dehumidifying air lt is introduced under a certain positive pressure into a drying chamber 7 containing the product 70 to be dehumidified—the dried air it coming from the dehumidifying apparatus 10 is drawn under a vacuum via the dry-air line 47 into and through the drying chamber 7 or over or through the product 70 to be dried which is located there, for which purpose no suction fan 41—as shown in FIG. 1—is arranged here in the dry-air discharge 4 of the dehumidifying apparatus 10 according to FIG. 1, but rather its function is taken over by a suction fan 71 arranged on the outlet side or in the discharge 57 for moisture-laden air lf from the drying chamber 7.

The essential feature of the inventive installation 100 according to FIG. 2 consists in the recycling of the moisture-laden air lf—expelled from the drying chamber 7 via the air-conduction line 57, as shown in FIG. 2 by broken lines, either directly or else in a favorable manner through a heating/cooling register 95 for setting a desired temperature and/or through a condenser 96 for setting, in particular reducing, the air moisture to a value which in each case is suitable or intended for use as regeneration air lr for the dehumidifying or regeneration of the adsorbent body 2, 2'—into one of the regeneration-air feeds or charging chambers 5, 5' and further into an installation lane I, II which is in regeneration operation RB in each case.

Figure 3:
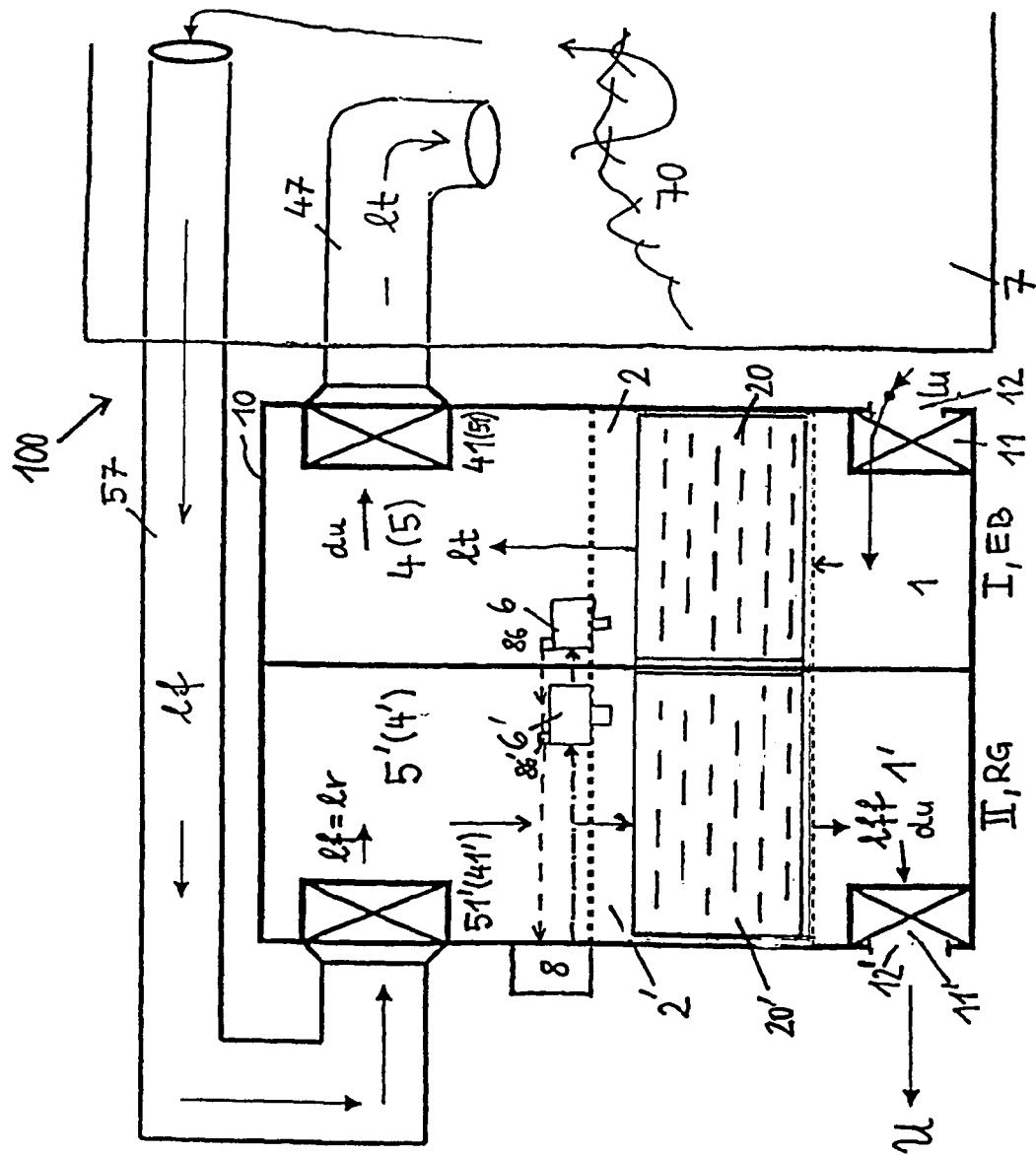

In the embodiment of the novel drying installation 100 shown in FIG. 3—with reference numerals otherwise remaining the same or otherwise being used in a similar manner—the dehumidifying apparatus 10 is divided strictly into two installation lanes I and II, the first lane of which, namely the lane I, is just at that moment in dehumidifying operation EB and the other, namely the lane II, is just at that moment in regeneration operation RB. Here, each of the two installation lanes I, II has its own dry-air discharge 4, 4', which in each case has the function of a regeneration-air feed or charging chamber 5, 5' in regeneration operation RB.

In the cycle stage shown in FIG. 3, the suction fan 11' located at the air inlet 12' (now functioning as air outlet) of the second fresh-air feed or inlet chamber 1' is put into operation, as is the further suction fan 51' arranged at the air inlet opening of the regeneration-air feed or charging chamber 5' (or dry-air discharge 4' after changing over the mode of operation EB, RB) and assisting the suction fan 11' just mentioned. These two suction fans 11', 51' which are in operation ensure that the air, with fan 11 switched off at the same time, is drawn in through the air inlet 12 into the fresh-air feed or inlet chamber 1 of the first installation lane I and is drawn at a vacuum du of, for example, 100 to 400 mbar through the first moisture adsorbent body 20 and through the first dry-air discharge 4 of the first installation lane I, through the likewise switched-off suction fan 51 at the end of the air discharge 4, and further through the air-conduction line 47 into and through the drying chamber 7 containing the product 70 to be dehumidified and is then conveyed as moisture-laden air lf through the air-conduction line 57 leading out of the drying chamber 7 and—in place of fresh or ambient air—as regeneration air lr by means of the running suction fan 51' into and through the second dry-air discharge 4' and further through the second adsorbent body 20', heated by means of the operating second magnetron 6', and is finally drawn as air lff, "doubly" moistened by the product 70 to be dehumidified and by the moisture desorbed by the adsorbent body, through the fresh-air feed or inlet chamber 1', now serving to expel this regeneration air, and is finally delivered to the environment U through the inlet opening 12' of the chamber 1' by means of the suction fan 11', which maintains the vacuum du.

The suction fans 11', 51' in the installation lane II are switched off and the suction fans 11, 51 in the installation lane I are switched on in a periodically alternating manner by means of the control unit 8, to be precise when the power-consumption sensor 86' of the second magnetron 6' signals a significant increase in the power consumed by the magnetron 6' to this control unit 8, which causes the latter to switch off the second magnetron 6' of the second installation lane II and likewise the suction fans 51' and 11' and to now switch on instead the first magnetron 6 and the two suction fans 11, 51 of the first installation lane I, so that the air is now drawn in the opposite direction first through the second installation lane II, through the drying chamber 7 and finally through the first installation lane I.

Figures 4A, 4B:
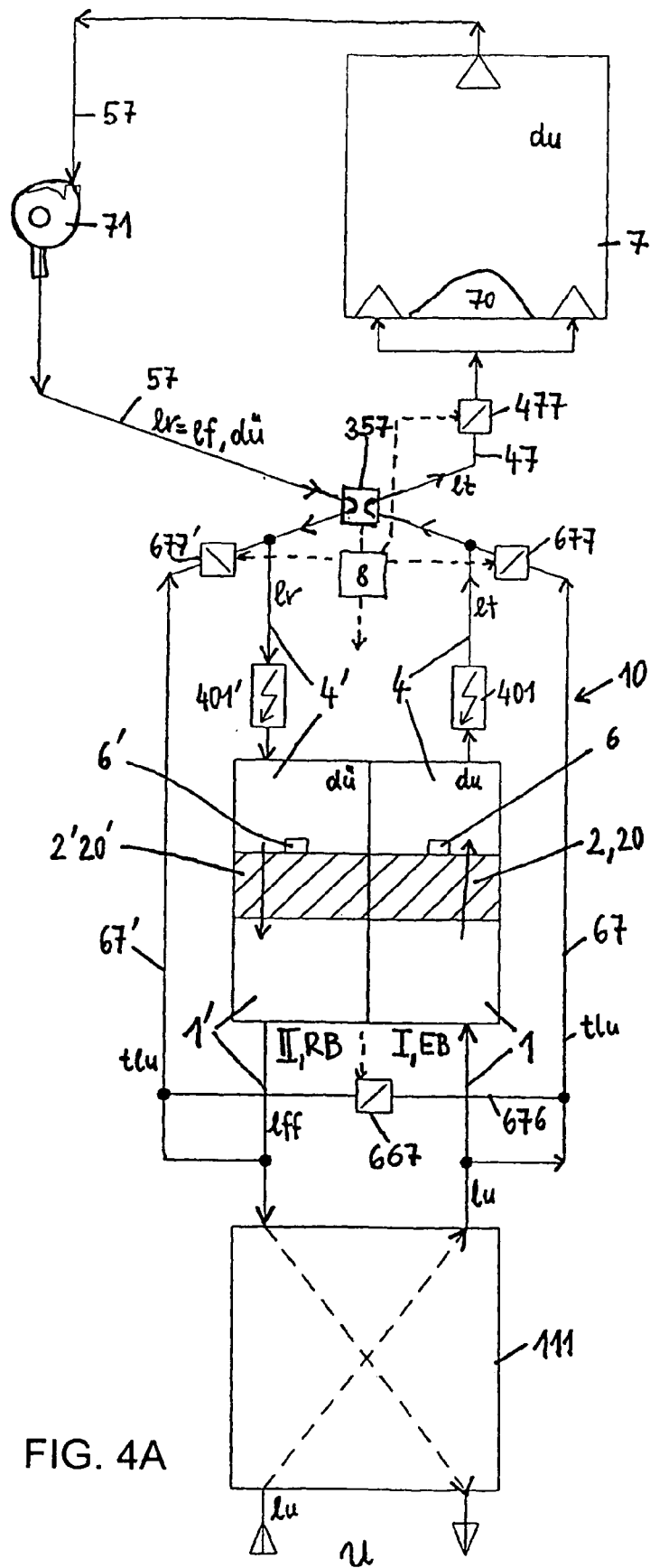

In principle, the embodiment of the drying installation 100 according to the invention which is shown in FIGS. 4a and 4b—with reference numerals otherwise remaining the same—and which is especially preferred within the scope of the invention and saves energy and installation costs, since only one suction fan unit is required, is constructed in a similar manner to the installation 100 shown in FIG. 3. However, as just mentioned, it has only one suction fan or only one exhauster 71 in the discharge line 57 for the air lf coming from or discharged from the drying space 7 and laden with moisture or water vapor due to the product 70 which is located there and is to be dehumidified. By means of this suction fan 71, fresh or ambient air lu is drawn on the suction side—as viewed overall—through the adsorbent body 20, 20' in the dehumidifying chamber 2, 2' of the installation lane I, II, which is in dehumidifying operation EB in each case in a periodically alternating manner, through the air-conduction line 47, with a cross changeover damper 357 correspondingly set by the control 8, in and through the drying space 7 and into the suction-side part of the discharge line 57 for air lf which is laden with moisture due to the product 70 to be dehumidified and is under vacuum.

On the pressure side of the suction fan, this moisture-laden air lf is delivered under positive pressure dü through the adsorbent body 20', heated by means of the magnetron 6' for the regeneration, in the installation lane II which is in regeneration operation RB.

For energy-saving reasons, both the fresh air lu, drawn in through the first installation lane I, before entering the lane I and the doubly moisture-laden regeneration air lff coming from the installation lane II are in each case directed in their lines 1, 1' through a heat exchanger 111, as a result of which the fresh air lu drawn into the installation 100 is preheated.

FIG. 4a, which shows the entire installation 100, shows the position, set by the control unit 8, of the cross changeover damper 357 when the installation lane I is in dehumidifying operation EB and the installation lane II is in regeneration operation RB.

The detail in FIG. 4b shows the position of the cross changeover damper 357 after the changeovers to regeneration operation RB in the installation lane I and to dehumidifying operation EB in the installation lane II, these changeovers being caused by the control 8 after corresponding moisture measuring data from the moisture sensors (not shown here) has been received.

It can clearly be seen that neither an interruption in the operation of the suction fan 71 nor a changeover of the same from suction to pressure operation is required. The suction fan 71 can thus continue to run during the respective change in the modes of operation in the installation lanes I and II.

Bypass lines 67, 67'—bypassing the two installation lanes I, II—can also be seen from FIG. 4a, these bypass lines 67, 67' in each case branching off from the fresh-air feeds 1, 1' and finally opening in each case into the dry-air discharge 4, 4' upstream of the cross changeover damper 357 described above.

Upstream of the point at which the bypass lines 67, 67' open into said dry-air discharge 4, 4' as mentioned, a respective airflow-rate regulating/reducing or shut-off damper 677, 677' is arranged in them.

The bypass lines 67, 67' can serve to regulate or readjust the moisture content of the air lt fed to the drying space 7 via the air-conduction line 47 and dehumidified in the installation lane I or II, which is in dehumidifying operation EB in each case, by a fresh-air partial flow tlu from in each case one of the bypass lines 67, 67' being admixed with said air lt, so that a respectively desired degree of drying or moisture is then ultimately present in the air lt fed to the drying space 7.

A short-circuit line 676 directly connecting the two bypass lines 67, 67' and having a short-circuit damper 667 which can be shut off, controlled or opened in each case is provided for the changeover operation.

Furthermore, FIG. 4a also shows an airflow-rate regulating or closing damper 477 in the air-conduction line 47 toward the drying space 7, by means of which the vacuum du in the drying space and thus the dehumidifying effect in the same can be regulated or readjusted.

Finally, FIG. 4a also shows heating registers 401, 401' at the respective dry-air discharges 4, 4' for heating or preheating the dry air lt before it enters the drying chamber 7 and/or the regeneration air lf or lr, laden with moisture from the product 70 to be dried, before it enters the adsorbent body 20, 20' to be regenerated in each case.

We claim:

1. An installation for drying a moisture-containing product, comprising:
  an air-dehumidifying apparatus for dehumidifying air, within which moist fresh or ambient air is moved through at least one body formed with a lumpy, granular and/or porous water-vapor adsorbent through which air can flow and which is based on a silicate-containing material, silica gel, and finally the air dehumidified there is directed over the product to be dried, which is arranged in a drying chamber or the like, the dehumidifying of the fresh or ambient air being interrupted within the dehumidifying apparatus when the saturation of the adsorbent body with water is achieved, and the water adsorbed by the adsorbent body being desorbed and expelled from the latter by heating and/or by means of a carrier airflow, said air-dehumidifying apparatus including at least two installation lanes with:

dehumidifying chambers each disposed downstream of a feed or inlet chamber for moist fresh or ambient air, accommodating said adsorbent body and each having a microwave generator or magnetron for heating said adsorbent body, and at least one discharge on an outflow side for discharging dehumidified air from said dehumidifying chambers;

regeneration-air feeds or charging chambers assigned in each case to one of said dehumidifying chambers and from which, directly or by way of regeneration-air conveying means, regeneration air is directed through said adsorbent body for desorption of water, adsorbed by said adsorbent body from the air laden with moisture from the product to be dried, after saturation of said adsorbent body is achieved; and on a dry-air outflow side of each of said dehumidifying chambers, a three-way changeover or closing member, shutting off or opening up, in each case in opposition to one another, either a path for the dry-air discharge toward said drying chamber or a path for the regeneration-air feed or charging chamber, or one three-way changeover damper;

said dehumidifying apparatus, for providing regeneration air, having at least one air-conduction line for the air expelled from said drying chamber and containing the moisture received from the product to be dried, and which, for regenerating said adsorbent body laden or saturated with water, can in each case be directed periodically to the regeneration-air feeds or charging chambers or to a regeneration-air charging fan thereof and can be introduced into one of said adsorbent bodies in one of said air-dehumidifying chambers and can be moved therethrough.

2. The installation according to claim 1, configured for drying a product selected from the group consisting of individual parts and pourable material, biological material, fuels, foodstuffs, and pharmaceuticals with dehumidified air having less moisture than the ambient air or containing a low moisture content of up to 1 g of water/kg of air.

3. The installation according to claim 1, wherein:

in said dehumidifying apparatus, the fresh or ambient air—in each case in an alternating manner—can flow first through one of the dehumidifying chambers of a first installation lane or its first adsorbent body, regenerated beforehand, with a first microwave generator switched off and with a first three-way changeover or closing member open for the dry-air discharge into the drying chamber and closed toward the regeneration-air feed or charging chamber, in a first direction from the first fresh- or ambient-air feed or inlet chamber toward said dry-air discharge;

while substantially at the same time the regeneration air can flow through the other or second dehumidifying chamber of a second installation lane having the second adsorbent body laden or saturated there with water, with a second microwave generator switched on and active in terms of heating, and with a second three-way changeover or closing member closed toward the dry-air discharge and open toward the regeneration-air feed or charging chamber, in the second direction, opposed to the first throughflow direction, from the second regeneration-air feed or charging chamber to the second fresh- or ambient-air feed or inlet chamber; and wherein, during a significant increase in the moisture content of the dehumidified air, flowing through the dry-air discharge toward the drying chamber and flowing out of the first adsorbent body of the first installation lane, beyond a respectively predetermined moisture level and/or during a decrease in the moisture of the regeneration air leaving the dehumidifying chamber and then flowing through the respective fresh- or ambient-air inlet chamber of the second installation lane and finally delivered to the environment;

by changeover of each of the three-way changeover or closing members, this changeover being controlled by means of the monitoring and control unit supplied with measuring data from sensors (89, 89', 89''; 86, 86'), the first dehumidifying chamber containing the now water-laden first adsorbent body of the first installation lane, with the first microwave generator there being switched on or activated, can be changed over to adsorbent regeneration operation, and the second dehumidifying chamber, containing the freshly regenerated adsorbent body, of the second installation lane, after the second microwave generator there has been switched off, can be changed over to air-dehumidifying operation.

4. The drying installation according to claim 1, wherein:

for the movement or conveying of the fresh or ambient air through the respective adsorbent body and of the air dehumidified by means of the latter through the dry-air discharge of the air-dehumidifying apparatus, at least one suction fan—generating a vacuum, of about 100 to 400 mbar, lying below the ambient pressure, in said discharge—is arranged in the dry-air discharge, and the dry air can be introduced on the pressure side by means of this suction fan, at a positive pressure lying above the ambient pressure, into the drying chamber containing the product to be dried or can be moved fluidically through the chamber and over or through the material; or in place of the suction fan in the dry-air discharge, a suction fan is arranged in the discharge of the drying chamber, this discharge being provided for expelling the air, laden with the moisture extracted from the product to be dried, from the drying chamber.

5. The drying installation according to claim 1, wherein each of the two regeneration-air feeds or charging chambers is provided with a separate fan for introducing regeneration air coming from the drying chamber and for delivering the regeneration air under positive pressure through said adsorbent body to be regenerated in each case.

6. The drying installation according to claim 1, which comprises one common fan for introducing regeneration air coming from the drying chamber and for delivering the regeneration air under positive pressure through said adsorbent body to be regenerated, wherein said common fan can in each case be changed over so as to supply each of these two feeds or chambers with regeneration air.

7. The drying installation according to claim 1, wherein:
said dehumidifying apparatus, in place of regeneration-air feeds or charging chambers, has at least two discharges for dehumidified air which are separate from one another and are in each case assigned to one of the dehumidifying chambers with their respective adsorbent body of the installation lanes and which are connected to the drying space via air-conduction lines which are connected to said discharges and open into the drying chamber containing the material to be dried or start from there,
said dry-air discharges connected to the air-conduction lines opening into the drying chambers or starting from the latter are at the same time regeneration-air feeds or charging chambers for air fed back as regeneration air and laden with moisture of the material to be dried, and
in each case a first and a second suction fan are arranged in a first and in a second air-inlet/outlet opening of the air-inlet chamber, in which arrangement, in each case in an alternating manner or in such a way as to be capable of being changed over periodically, air or ambient air, by means of the second suction fan put into operation and held in operation by the control unit—with the first suction fan stopped at the same time—can be drawn successively through the first installation lane, comprising the first fresh- or ambient-air feed or inlet chamber, the first adsorbent body and the first dry-air discharge, further through a first air-conduction line, into and through the drying space containing the product to be dehumidified and then further, with air laden with moisture from the dehumidified product, as regeneration air via a second air-conduction line, through the installation lane, comprising the second regeneration-air feed or charging chamber, the second adsorbent body, delivering the water adsorbed by it to the regeneration air—when the second microwave generator is put into operation from the control unit—and the second fresh-air feed or inlet chamber, of the dehumidifying apparatus and can finally be delivered to the environment; and
wherein, after regeneration of the second adsorbent body has been completed, the second suction fan and the second microwave generator can be shut down and the first suction fan and the first microwave generator of the first dehumidifying chamber can be put into operation, likewise by means of the control unit, and the fresh or ambient air can now be drawn in the opposite direction first through the second installation lane of the dehumidifying apparatus, through the drying space containing the product to be dried, and finally through the first installation lane of the air-dehumidifying apparatus and can finally be delivered as doubly moist regeneration air to the environment.

8. The drying installation according to claim 7, wherein a suction fan assisting the respectively operating suction fan of the air-inlet chamber and put into operation and held in operation synchronously with said suction fan is in each case additionally disposed in both the first and the second installation lane in each case in the region of the transition from the dry-air discharge to the first air-conduction line leading into the drying chamber and in the region of the transition of the second air-conduction line, coming from the drying chamber, into the regeneration-air feed or charging chamber.

9. The drying installation according to claim 1, wherein:
said dehumidifying apparatus has at least two dry-air discharges for dehumidified air which are separate from one another and are in each case assigned to one of the dehumidifying chambers with their respective adsorbent body of the installation lanes and which are connected to the drying space via the air-conduction lines which are connected to said discharges and open into the drying space containing the material to be dehumidified;
said dry-air discharges are at the same time regeneration-air feeds or charging chambers for air discharged from the drying chamber and laden with the moisture from the material to be dried;
a suction fan is disposed in one of said air-conduction lines;
said suction fan is disposed to successively draw fresh or ambient air through the first air feed or inlet chamber, through the first adsorbent body, and through the first dry-air discharge of a first installation lane, further via the first air-conduction line through the drying space containing the product to be dehumidified, and then further with the moisture from the dehumidified product, and the moist air, which is under the pressure-side pressure of the suction fan, is moved or conveyed as regeneration air via an air-conduction changeover member, in particular a cross changeover damper, the second regeneration-air feed or charging chamber, the second adsorbent body, delivering the moisture to the regeneration air by means of the second microwave generator put into operation and held in operation by the control unit, in the second dehumidifying chamber and the second air-inlet chamber, through which the air originating from the product to be dehumidified and containing the water desorbed by the adsorbent body has flowed, of the second installation lane and is finally delivered to the environment; and
wherein, by way of the control unit, after regeneration of the second adsorbent body has been completed, the air-conduction changeover member, in particular the cross changeover damper, can be changed over and, when the second microwave generator is switched off essentially at the same time by means of the control unit, the first microwave generator of the first dehumidifying chamber of the first installation lane can be put into operation, and the fresh or ambient air, by means of the suction fan in the air-conduction line, can now be successively drawn in the opposite direction first through the second installation lane, via the first air-conduction line and through the drying space containing the product to be dehumidified and is then moved or forced, under the pressure-side pressure of the suction fan, through the first installation lane of the air-dehumidifying apparatus and is finally delivered to the environment.

10. The drying installation according to claim 9, wherein the fresh-air and ambient-air feeds, through which doubly moisture-laden regeneration air and fresh or ambient air can flow in each case in an alternating manner, is a heat exchanger which transfers heat of the doubly moisture-laden regeneration air, discharged from the microwave-heated adsorbent body, of one of the installation lanes into fresh or ambient air directed into the respectively regenerated adsorbent body of the respective other installation lane.

11. The drying installation according to claim 9, wherein:
fresh-air partial flow or bypass lines bypassing the installation lanes branch off from the fresh- or ambient-air feeds, which fresh-air partial flow or bypass lines open into the air-conduction line connected to the drying space, in each case in such a way that they can be regulated in terms of flow rate by means of a shut-off member, and by means of which fresh-air partial flow or bypass lines, in addition to the air dehumidified in each case when passing through one of the installation lanes, a partial flow of fresh or ambient air can be introduced into the air-conduction line; and said two fresh-air partial flow lines are connected to one another by a connecting line having a short-circuit member, in particular a short-circuit damper.

12. The drying installation according to claim 11, which further comprises an airflow choke or closing member disposed in said air-conduction line for setting a respectively desired vacuum in said drying chamber.

13. The drying installation according to claim 11, which comprises moisture measuring sensors for determining or measuring the moisture content of the air dehumidified by way of said first adsorbent body in the installation lane which is in dehumidifying operation in each case or of the moisture-laden regeneration air coming out of the microwave-heated, second adsorbent body of the second installation lane, respectively disposed in each of said two fresh-air or ambient-air feeds or inlet chambers of the two installation lanes of the air-dehumidifying apparatus and at least in the dry-air discharge, wherein said moisture measuring sensors are connected for the flow and exchange of measuring data to the monitoring and control unit, which is connected for the flow and exchange of control data to the closing members, which can be changed over in each case in opposition to one another, or else to the air-conduction changeover member, and optionally to an airflow choke or closing member and/or to a short-circuit member.

14. The drying installation according to claim 13, wherein said measuring sensor includes a temperature compensator.

15. The drying installation according to claim 13, wherein said air-conduction changeover member is a cross-changeover damper, and said short-circuit member is a short-circuit damper.

16. The drying installation according to claim 13, which comprises, in addition to or as an alternative to said moisture measuring sensors, a sensor for detecting a significant change in a current intensity or voltage of a power consumed by the microwave generator, and wherein said sensor is connected to said monitoring and control unit, which is connected for the flow and exchange of control data to the three-way changeover members, or to the air-conduction changeover member and optionally also to the short-circuit damper and/or airflow choke or closing member, and/or to the suction fans which can be put into operation or switched off in each case in opposition to one another.

17. An installation for drying a moisture-containing product, comprising:

an air-dehumidifying apparatus for dehumidifying air, at least one adsorbent body disposed in said air-dehumidifying apparatus, wherein the air, after dehumidification in said adsorbent body is directed over the product to be dried;

wherein a dehumidification of fresh or ambient air in said dehumidifying apparatus is interrupted when a saturation of said adsorbent body with water is achieved, and the water adsorbed by said adsorbent body is desorbed and expelled by at least one of heating and by way of a carrier airflow;

said air-dehumidifying apparatus including at least two installation lanes with:

dehumidifying chambers each disposed downstream of a feed or inlet chamber for moist fresh or ambient air, accommodating said adsorbent body and each having a microwave generator or magnetron for heating said adsorbent body, and at least one discharge on an outflow side for discharging dehumidified air from said dehumidifying chambers;

regeneration-air feeds or charging chambers assigned in each case to one of said dehumidifying chambers and from which regeneration air is directed through said adsorbent body for desorption of water, adsorbed by said adsorbent body from the air laden with moisture from the product to be dried, after saturation of said adsorbent body is achieved; and on a dry-air outflow side of each of said dehumidifying chambers, a three-way changeover or closing member, shutting off or opening up, in each case in opposition to one another, either a path for the dry-air discharge toward said drying chamber or a path for the regeneration-air feed or charging chamber;

said dehumidifying apparatus, for providing regeneration air, having at least one air-conduction line for the air from said drying chamber and containing the moisture received from the product to be dried, and which, for regenerating said adsorbent body laden or saturated with water, can in each case be directed periodically to the regeneration-air feeds or charging chambers or to a regeneration-air charging fan thereof and can be introduced into one of said adsorbent bodies in one of said air-dehumidifying chambers and can be moved therethrough.

* * * * *